Feb. 22, 1966  C. EYER  3,236,187
ENERGY TRANSFORMER
Filed Dec. 19, 1962  2 Sheets-Sheet 1

INVENTOR
CHARLES EYER
BY
Dicke & Craig
ATTORNEYS

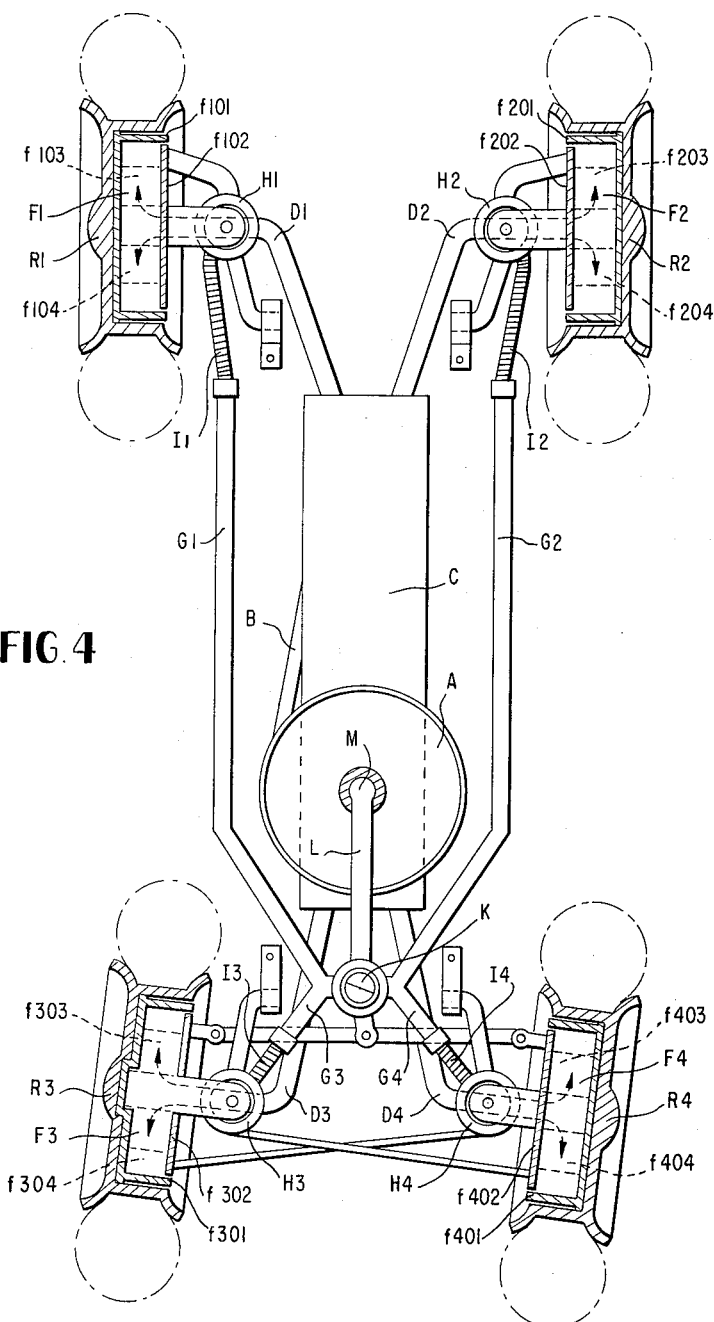

United States Patent Office 3,236,187
Patented Feb. 22, 1966

3,236,187
ENERGY TRANSFORMER
Charles Eyer, Soultz-sous-Forets, France, assignor of one-third to Consulta Treuhand G.m.b.H., Stuttgart, Germany, and one-third to Doris Eyer, Soultz-sous-Forets, France
Filed Dec. 19, 1962, Ser. No. 245,929
Claims priority, application France, Dec. 20, 1961, 7,307
3 Claims. (Cl. 103—130)

The present invention relates to an apparatus which is adapted to serve as an energy transformer to transform a pressure into a rotary movement or vice versa, and in which the pressure medium may be either a liquid or a gaseous medium.

Prior to this invention there have been similar energy transformers which are based upon the effects of centrifugal force. However, these known energy transformers have the disadvantage that they require an extremely high rotational speed in order to work properly. There are other known types of rotary energy transformers, for example, fluid pumps or blowers which operate either by the interengagement of gear wheels, the number of teeth of which may be made very small or by means of eccentrics. All of these rotary energy transformers have the disadvantage that, aside from the internal friction of the liquid, their movable parts are also subjected to a very high friction either on each other or on stationary parts. All of these factors together reduce the efficiency of these energy transformers considerably.

It is an object of the present invention to overcome all of these disadvantages of the known apparatus of this type by providing an energy transformer which consists of a central or main rotor which is preferably of a cylindrical shape and carries one or more satellites, each of which is located in a suitable recess in the main rotor and is rotatable relative to the rotor about the axis of a shaft which is mounted on the main rotor. Each of these satellites is provided with one or more recesses into which partitions engage which extend radially toward the axis of the main rotor. The satellites may be either synchronized or freely rotatable.

These and further features and advantages of the present invention will become more clearly apparent from the following detailed description thereof which is to be read with reference to the accompanying drawings, in which—

FIGURE 3 shows, partly in section, a plan view of a modification of the energy transformer according to the invention; while FIGURE 4 shows a diagrammatic illustration of the application of energy transformers according to the invention in a motor vehicle, as seen from below and with the vehicle wheels being shown in section.

Figure 1:
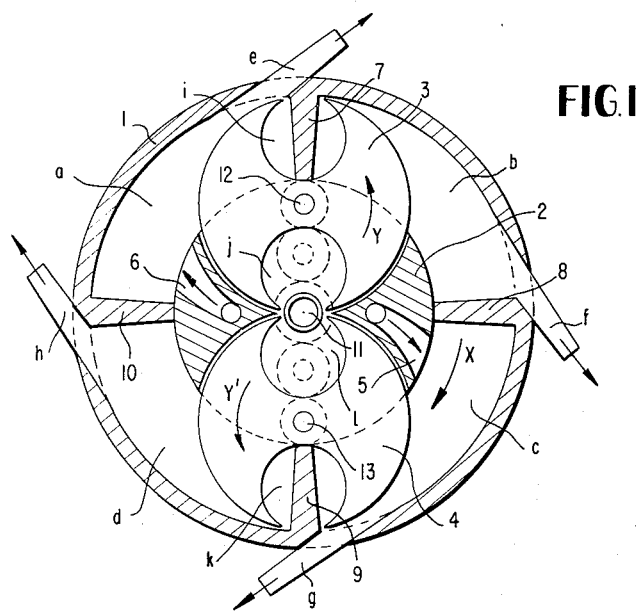
FIGURE 1 shows, partly in section, a plan view of an energy transformer according to the invention.
Figure 2:
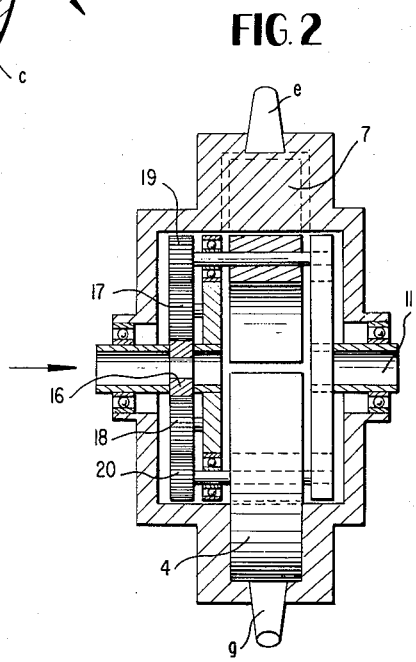
FIGURE 2 shows a vertical section of the apparatus according to FIGURE 1, as seen from the front thereof.

As illustrated in FIGURES 1 and 2, the energy transformer according to the invention consists of a housing 1 in which a main rotor 2 revolves about the axis of a central shaft 11. The main rotor 2 is equipped with two satellites 3 and 4 which are rotatable relative to rotor 2 within corresponding arcuate recesses in the rotor about the axes of their shafts 12 and 13 which are mounted on rotor 2. Each of the satellites 3 and 4 has a diameter which amounts to exactly one half of the diameter of the inner wall of housing 1. If the rotor 2 runs, for example, in the direction x, as indicated in FIGURE 1 by the arrow, and the satellites 3 and 4 then revolve about their axes 12 and 13 in the directions as indicated by the arrows y and y', respectively, at twice the speed as the main rotor 2, each point on the circumference of each satellite then moves according to a well known geometrical principle along a straight line which extends through the central axis of housing 1, that is, along a diametrical line of this housing. Housing 1 is provided with four partitions 7, 8, 9, and 10, each of which extends up to the outer peripheral surface of the cylindrical main rotor 2 and so closely to the latter as to attain a sufficiently tight seal. These partitions divide the inside of housing 1 into the chambers a, b, c, and d and each of them engages at its proper turn into the recesses i, j, k, and l of the satellites 3 and 4. The walls of these partitions 7, 8, 9, and 10 are disposed within planes, the extensions of which intersect with the central axis of the housing so that according to the above geometrical principle the edges of the recesses i, j, k, and l move along these walls in close engagement therewith, but without friction thereon.

As already indicated, the main rotor 2 has preferably a cylindrical shape, whereas the satellites 3 and 4 may have either a cylindrical or spherical shape. It is, however, also possible to make the satellites of any other curved or prismatic shape, provided that the longitudinal axes of the prisms extend parallel to the axes 12 and 13. Naturally, in this case it is assumed that the shape of the inner wall of the housing is designed accordingly.

The liquid or gaseous medium which is required for producing the pressure is supplied, for example, through the central shaft 11 which is for this purpose provided with a concentrical bore and communicates through substantially radial channels 5 and 6 with chambers a, b, c, and d. The medium then flows in the direction as indicated by the arrows and leaves the chambers a, b, c, and d through the discharge openings e, f, g, and h, respectively. In order to insure the proper operation of the apparatus and to prevent during the rotation any friction between the satellites 3 and 4 and the respective walls of the chambers, the satellites are synchronized in any suitable manner, for example, by means of a gear unit, as illustrated in FIGURE 2, which comprises a central pinion 16 which is rigidly connected to the housing 1 and around which through two freely rotatable pinions 17 and 18 the pinions 19 and 20 revolve which are secured to the shafts 12 and 13 of satellites 3 and 4. This gear unit is made of such dimensions that desired transmission ratio of 1 to 2 between the angular velocity of the main rotor 2 and that of the satellites will be attained. In FIGURE 2, the partition 7 is shown in a longitudinal section, while the satellite 3 is shown in an axial section. Since the satellite 4 is shown as seen from the front, the partition 9 which is in engagement therewith is not visible and therefore only indicated in dotted lines.

The operation of the apparatus as above described is as follows: When the main rotor 2 rotates in the direction of the arrow x and the satellites 3 and 4 rotate about shafts 12 and 13 in the direction of the arrows y and y', respectively, the volume of chambers a and c increases and thereby permits the pressure medium to enter as the result of the centrifugal force acting in the intake channels 5 and 6 and of the vacuum in chambers a and c. At the same time, the volume of chambers b and d decreases and the medium is expelled through the discharge openings f and h. The rotary movement of the central shaft 11 is in this manner transformed into a pressure of the medium which flows through the apparatus. Of course, the same effect could be attained if the medium is passed into the chambers through the openings e, f, g, and h and is expelled through the channels 5 and 6, although in this case the effect of the centrifugal force cannot be employed for the intake of the medium.

The procedure as above described may, of course, be reversed with the result that the pressure prevailing in the medium will then be transformed into a rotary motion. The hydraulic or pneumatic energy of the medium entering through the channels 5 and 6 or the openings $e$, $f$, $g$, and $h$ is then transformed during the passage of the medium through the apparatus into a rotary motion.

Figure 3:
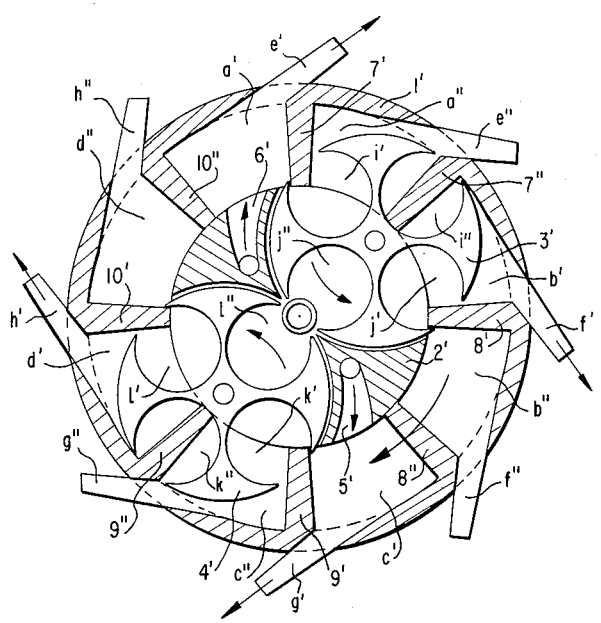

A modification of the invention is illustrated in FIGURE 3, in which each satellite is provided with four recesses, while the number of walls separating the individual chambers from each other and therefore also the number of these chambers is increased to eight. The different parts of this apparatus are indicated in FIGURE 3 by the same reference characters as in FIGURE 1 to which, however, single or double primes are added. The operation of this energy transformer is fundamentally the same as that as described with reference to FIGURES 1 and 2, so that no additional description appears to be necessary. The advantage of this modification is based on the fact that the system is synchronized automatically and does not require any additional elements such as a gear unit for its synchronization. In addition, the pressure characteristic is considerably better balanced and there are no dead centers.

One example of the manner in which the invention may be applied is illustrated diagrammatically in FIGURE 4 which shows, as seen from below, a hydraulic system which may be employed for the multiple purpose of serving as a drive unit for driving a vehicle and also as a brake system for the vehicle, and further for producing a differential effect and an automatic steering effect for the vehicle. In FIGURE 4, the engine and compressor unit is indicated at A. It comprises an engine which may be of any desired type, for example, a rotary piston engine, and a rotary energy transformer which is coupled to the engine. This energy transformer is a compressor which may be formed, for example, by a turbine, provided that the engine rotates at a sufficient speed, or more preferably by an apparatus according to the invention as described above. The compressor of the engine and compressor unit A is connected through a line B to a container C which is designed so as to be able to take over the function of a surge tank and is therefore only partly filled with the fluid, for example, oil, which serves for the transmission of energy. In FIGURE 4, the four wheels R1 to R4 of the vehicle are driven individually. For this purpose, each wheel is provided with a separate revolving energy transformer F1 to F4, respectively, which is designed according to the invention. In the embodiment of the invention as illustrated it is assumed that the housing of a separate apparatus of the type as shown in FIGURE 3 is rigidly secured to each wheel, whereas the main rotor is secured to the frame of the vehicle by means of spring elements H1 to H4, respectively, in such a manner that it cannot carry out any rotary movements. In other words, the main rotor of the apparatus according to FIGURE 3 operates as a stator, which means that the functions of the housing and the main rotor are reversed as against FIGURE 3. In FIGURE 4, the housings of the different energy transformers are symbolically illustrated in the form of $f101$, $f201$, $f301$, and $f401$, whereas the disks $f102$, $f202$, $f302$, and $f402$ also illustrate symbolically the stators, each of which takes over the function of the main rotor in the apparatus according to FIGURE 3. The satellites are indicated in FIGURE 4 in dotted lines at $f103$, $f104$, $f203$, $f204$, $f303$, $f304$, $f403$, and $f404$.

Each of the energy transformers F1 to F4 is directly connected to the container C by the intake lines D1 to D4, respectively. After the liquid has passed through the energy transformers F1 to F4, it is returned to the compressor of the unit A through the return lines G1 to G4, respectively. Each of these return lines is provided with a flexible tube I1 to I4 of a sufficient length which during the driving of the vehicle does not interfere with the vibrations and displacements of the four wheels relative to each other and relative to the vehicle frame. Contrary to the intake lines, the return lines G1 to G4 do not form a direct connection between the driving elements F1 to F4 of the wheels and the unit ABC, but on each side are connected to each other and terminate into a device K. The common inlet of lines G1 and G3 therefore enters at the left side and that of lines G2 and G4 at the right side of the device K. This device K forms a kind of control valve which contains a segmental valve member which is coupled in a suitable manner to the steering mechanism which is controlled by the steering wheel. The movements of this segment depend upon the steering operation and are in accordance with the desired changes in the driving direction, and it then more or less opens or closes the two inlets of the line system G1, G3 or G2, G4, respectively, whereby the effect of the pressure prevailing in the liquid upon the driving elements of the outer wheels when driven through a curve is increased, while the same effect upon the inner wheels is diminished. The steering operation is thus considerably simplified since it occurs almost automatically through the different speeds of the wheels. Thus, there is also no necessity for the provision of a conventional differential gear. The outlet of the device K leads via the central return line L to the inlet opening M of the compressor of the drive unit A.

The inlet opening M of this compressor of the drive unit A is provided with a device similar to a three-way valve which serves for regulating the speed, for changing from a forward drive to a reverse drive, and for braking. When this device is fully closed, the circulation of the liquid is stopped and the driving elements of the individual wheels act as brakes. When it is opened in one or the other direction, the effect of the forward and reverse driving parts of the hydraulic system is reversed. The speed of the vehicle is regulated in accordance with the degree to which this device is opened.

All of the elements which act upon the steering, the speed, and the braking or which produce the differential effect are provided in the return line. The engine therefore continues to run at a uniform speed regardless of the proceedings which are carried out by these elements. There is thus no need for any gears with a gear-shift mechanism.

The invention also provides a hydraulic spring mechanism H1 to H4. The function of the elements of this mechanism depends upon the return line. In this manner it is possible to adapt this spring mechanism automatically to the steering of the vehicle since the pressure in these lines always increases or decreases in accordance with the position of the control segment K.

It is to be understood that the embodiments of the invention as previously described are merely to be regarded as examples of the numerous possibilities in which it may be applied in many different fields and that the specific application of the invention according to FIGURE 4 is not to be regarded as limiting its scope. If the invention is to be applied to a motor vehicle, it is also possible to combine the energy transformer according to the invention with those of other types.

Having thus disclosed my invention in detail, what I claim is:

1. A rotary energy transformer employing a fluid medium for transforming a rotary motion into pressures or vice versa comprising a circular housing, a central rotor of cylindrical shape rotatable within said housing, said rotor having a shaft, a plurality of satellites, each disposed within an aperture in said rotor and rotatable with but relative to said rotor, each of said satellites having a plurality of recesses, and a plurality of partitions projecting radially inwardly from said housing toward the axis of said rotor and adapted to engage into said recesses in said satellites, said partitions comprising walls defined by planes intersecting the axis of said central rotor, said recesses comprising edge portions engageable with said walls, said satellites having cylindrical shapes, the diameter of each of said satellites being equal to one-half of the inner diameter of said circular housing, means including said plurality of recesses in each of said satellites and said plurality of partitions for synchronizing said satellites and said central rotor with each other so that said satellites have twice the angular velocity of said central rotor, said partitions being of an even number and dividing the interior of said circular housing into pairs of diametrically opposite chambers, said satellites comprising segmental portions equal in number to the number of said pairs of diametrically opposite chambers, movements of said satellites in a circular direction parallel to the peripheral portion of said circular housing in response to rotary movement of said control rotor being effective to alternately equally increase and decrease the volumes of the chambers of each of said pairs of diametrically opposite chambers in turn.

2. A rotary energy transformer according to claim 1, wherein said rotor comprises a continuous peripheral portion, said partitions having end portions in sealing contact with said continuous peripheral portion.

3. A rotary energy transformer employing a fluid medium for transforming a rotary motion into pressures or vice versa comprising a circular housing, a central rotor of cylindrical shape rotatable within said housing, a plurality of satellites, each disposed within an aperture in said rotor and rotatable with but relative to said rotor, each of said satellites having a plurality of recesses, and a plurality of partitions projecting radially inwardly from said housing toward the axis of said rotor and adapted to engage into said recesses in said satellites, said partitions comprising walls defined by planes intersecting the axis of said central rotor, said satellites having part cylindrical contours, the diameter of each of said satellites being equal to one-half of the inner diameter of said circular housing, means for imparting rotative movements to said satellites relative to said circular rotor at twice the angular velocity of said rotor and synchronizing said movements with the rotation of said rotor, said means comprising pairs of oppositely disposed recesses in each of said satellites, segmental portions spacing said recesses, said segmental portions comprising mutually oppositely disposed edge portions engaging in turn said walls.

References Cited by the Examiner

UNITED STATES PATENTS

| | | | |
|---|---|---|---|
| 1,176,307 | 3/1916 | Manly | 180—6.3 |
| 1,199,904 | 10/1916 | Kettler | 60—53 |
| 1,408,839 | 3/1922 | Sparrow | 103—130 X |
| 1,629,202 | 5/1927 | Conklin | 230—156 |
| 1,963,091 | 6/1934 | Jenkins | 180—66 |
| 2,394,160 | 2/1946 | Emmitt | 180—66 X |

FOREIGN PATENTS

| | | |
|---|---|---|
| 216,549 | 5/1924 | Great Britain. |
| 336,539 | 10/1930 | Great Britain. |
| 580,400 | 8/1924 | France. |
| 604,379 | 1/1926 | France. |

BENJAMIN HERSH, *Primary Examiner.*

A. HARRY LEVY, *Examiner.*